US 6,665,463 B2

(12) United States Patent
Baron et al.

(10) Patent No.: US 6,665,463 B2
(45) Date of Patent: Dec. 16, 2003

(54) OPTICAL SWITCHING SYSTEM

(75) Inventors: Itzhak Baron, Ramat Gan (IL);
Michael Tilleman, Kfar Sava (IL);
Michael Wasserstein, Tel-Aviv (IL)

(73) Assignee: Tera Op, Inc., Wilmington, DE (US)

( * ) Notice: Subject to any disclaimer, the term of this patent is extended or adjusted under 35 U.S.C. 154(b) by 0 days.

(21) Appl. No.: 10/116,022

(22) Filed: Apr. 2, 2002

(65) Prior Publication Data

US 2003/0185495 A1 Oct. 2, 2003

(51) Int. Cl.[7] .................................................. G02B 6/26
(52) U.S. Cl. ......................................................... 385/18
(58) Field of Search .............................. 385/14–24, 49, 385/50, 53, 88, 89, 134, 135, 149; 359/119, 125, 130

(56) References Cited

U.S. PATENT DOCUMENTS

| | | | |
|---|---|---|---|
| 4,933,944 A | 6/1990 | McGraw | 372/18 |
| 4,935,931 A | 6/1990 | McGraw | 372/18 |
| 5,070,260 A | 12/1991 | Wong | 359/330 |
| 5,177,633 A | 1/1993 | Wong | 359/330 |
| 5,408,556 A | 4/1995 | Wong | |
| 5,457,556 A | 10/1995 | Shiragaki | |
| 5,715,337 A | 2/1998 | Spitzer et al. | |
| 5,872,880 A | 2/1999 | Maynard | |
| 5,937,117 A | 8/1999 | Ishida et al. | |
| 5,959,767 A * | 9/1999 | Fatehi et al. | 359/341.3 |
| 6,038,058 A | 3/2000 | Robinson et al. | 359/293 |
| 6,075,239 A | 6/2000 | Aksyuk et al. | |
| 6,088,145 A | 7/2000 | Dickensheets et al. | |
| 6,097,859 A | 8/2000 | Solgaard et al. | |
| 6,154,587 A | 11/2000 | Okayama | |
| 6,198,565 B1 | 3/2001 | Iseki et al. | 359/224 |
| 6,205,267 B1 | 3/2001 | Aksyuk et al. | |
| 6,222,954 B1 | 4/2001 | Riza | |
| 6,259,835 B1 | 7/2001 | Jing | |
| 6,288,807 B1 | 9/2001 | Wu et al. | |
| 6,304,690 B1 * | 10/2001 | Day | 385/24 |
| 6,317,529 B1 | 11/2001 | Kashima | |
| 2001/0008457 A1 | 7/2001 | Zhang | |

OTHER PUBLICATIONS

Bishop et al. Micromirrors Relieve Communications Bottlenecks. *Photonics Spectra* 167–169 (2000).
Press Release: OMM MEMS–based Optical Switched Pass Rigorous Telcordia Requirements. www.omminc.com (Jul. 16, 2001).
Press Release: A World's First for Optical Switching: Live Data Traffic Switched by MEMS–bsaed Optical Switch Subsystems Delivered by OMM Inc. www.omminc.com (Mar. 26, 2000).
Press Release: Optical switches delivered by Optical Micro Machines Inc. (OMM) at the core of Siemens' Transxpress ™ optical service node. Siemens demonstrates optical switching at CeBIT 2000 using optical switching subsystems from OMM Inc. www.omminc.com (Mar. 7, 2000).
Press Release: Revolutionary MEMS Optical Switch Slated to Become the Heart of Optical Communications Systems. www.omminc.com (Dec. 9, 1999).
Press Release: OMM Focuses Market Position on Mid–sized MEMS Photonic Switch Modules and Subsystems. www.omminc.com (Jul. 27, 2001).
Website: www.omminc.com, discovered on Aug. 8, 2001, however available maybe as early as Feb. 2000.

* cited by examiner

*Primary Examiner*—Akm Enayet Ullah
(74) *Attorney, Agent, or Firm*—Mark M. Friedman

(57) ABSTRACT

The present invention relates to an optical switching system that includes two channel switchers. Each switcher includes an optical switch, a wavelength converter, and a multiplexer. Selectors provide and receive optical WDM signals to and from the two channel switchers in alternating fashion such that the latency time of the optical switching system is minimized to the latency time of a selector. The optical switch of an inactive switcher is configured while the active switcher converts a WDM signal.

22 Claims, 5 Drawing Sheets

OPTICAL SWITCHING SYSTEM

BACKGROUND OF THE INVENTION

1. Field of the Invention

The present invention relates generally to optical switching and, more specifically, to minimizing switch latency time in an optical switching system.

2. Description of the Related Art

Data transmission technology is currently undergoing the dramatic change from electrical signal-based transmission to optical signal-based transmission. The optical revolution is providing high data transmission rates using inexpensive, reliable devices. A key advantage of optical signal technology is the ability of a single transmission line, an optical fiber, to support wavelength division multiplexed (WDM) signal transmission. WDM signals carry a number of optical signals at different wavelengths simultaneously without interference among the signals. Thus, a single optical fiber can carry simultaneously many "channels" of communication. The data of any particular such channel is expressed by the time-varying intensity of the optical signal at the channel wavelength. Typical data transmission is expressed in binary format with, for example, a low intensity representing a binary "0" and a higher intensity representing a binary "1". Each binary value is called a bit (b). Optical networks currently support data transmission rates at a single wavelength of 2.5 to 10, gigabits/second (Gb/s), and increased data transmission rates as high as 40 Gb/s and higher are anticipated. Current Ethernet protocols utilize 512 bit data transmissions requiring 51.2 ns at a rate of 10 Gb/s.

A functional wide-area optical network exists as a connected set of distributed routing and switching nodes. User equipment can be connected to these nodes to receive and transmit data. Many communications must be transmitted simultaneously through a network. It is not feasible to permanently or globally allocate unique wavelengths to each user or particular node-to-node network connection. A flexible networking strategy is preferred which can tentatively and locally allocate a wavelength "channel" to a particular data packet to be transmitted. This allows a particular data packet to traverse a network utilizing immediately and locally available channels instead of being delayed until a particular channel is globally open. Such flexibility limits the number of necessary transmission lines and the costs thereof. This strategy requires that a data packet initiated at one wavelength be seamlessly converted where necessary to another wavelength. The data-carrying intensity pattern of the output signal of such a conversion must match that of the input signal.

Recent technological advances in the characterization, production, and application of non-linear optical materials offer efficient optical wavelength conversion. Wavelength converters are available to receive a single-wavelength input signal and produce, along a conversion waveguide, an output signal at a wavelength different from that of the input signal. Each such waveguide in such a converter supports efficient conversion to a particular output wavelength. This provides a challenge to the wavelength conversion of WDM signals; namely, each single-wavelength component of a WDM signal must be separately directed to a particular waveguide which supports conversion of that component to the desired output wavelength. Furthermore, components of similar wavelength of successive packets or other data trains can be destined for conversion to different output wavelengths; thus the directing of the components must be controllable and not fixed.

Recent advances in microelectromechanical systems (MEMS) technology provide movable reflectors to support the selective directing of optical signals. However, MEMS reflectors are closed to data transmission while they are physically positioned, a process requiring a latency of 25 nanoseconds (ns) or more. Thus, while promising to provide controllable directing of single-wavelength signals to selected conversion waveguides, MEMS reflectors have lengthy switching times by optical communications standards.

What is needed in the art of optical communication switching is an optical switching system providing the wavelength conversion of each single-wavelength component of a WDM signal. Optimal switch architecture will provide rapid switch reconfiguration between converted WDM signals with minimal data flow loss.

SUMMARY OF THE INVENTION

The present invention relates to an optical switching system that includes two channel switchers. Each switcher includes an optical switch, a wavelength converter, and a multiplexer. Selectors provide and receive optical WDM signals to and from the two channel switchers in alternating fashion such that the latency time of the optical switching system is minimized to the latency time of a selector. The optical switch of an inactive switcher is configured while the active switcher converts a WDM signal.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
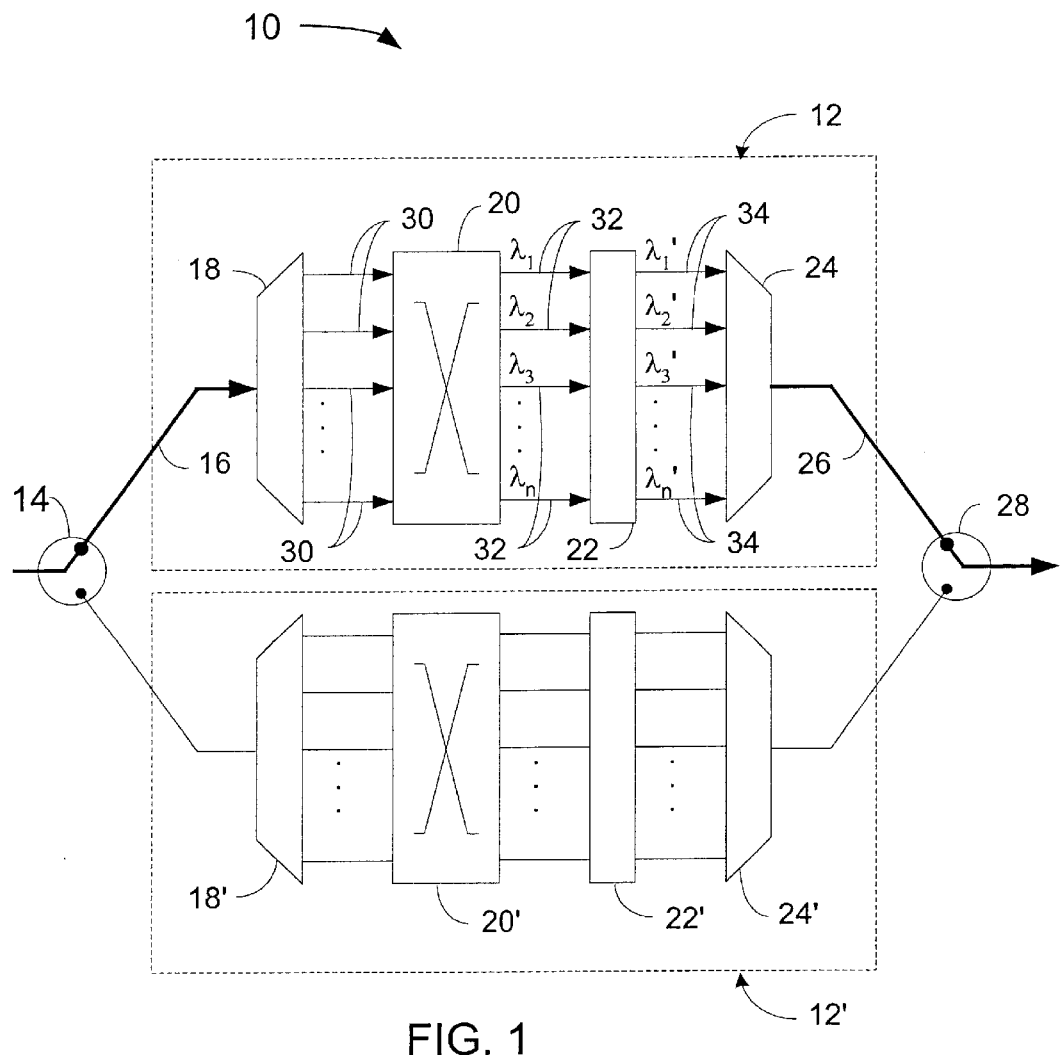
FIG. 1 is a block diagram of one embodiment of an optical switching system.

As illustrated in FIG. 1, an optical switching system 10 includes parallel first and second channel switchers 12 and 12', respectively. Nevertheless, other embodiments of the system can include more such switchers. A first optical selector 14 receives a wavelength-division multiplexed (WDM) input signal 16 from an input buffer (not shown) or other suitable source, and provides it to first channel switcher 12. First channel switcher 12 includes a first demultiplexer 18, a first optical switch 20, a first wavelength converter 22, and a first wavelength multiplexer 24. Second channel switcher 12' includes a second demultiplexer 18', a second optical switch 20', a second wavelength converter 22', and a second wavelength multiplexer 24'.

First channel switcher 12 receives WDM input signal 16 via first optical selector 14 and produces a converted WDM signal 26. A second optical selector 28 receives converted WDM signal 26 from first channel switcher 12. First channel switcher 12 is illustrated as currently active, as designated by arrows, i.e., it is converting the wavelength of an optical data packet carried by WDM input signal 16.

Figure 3:
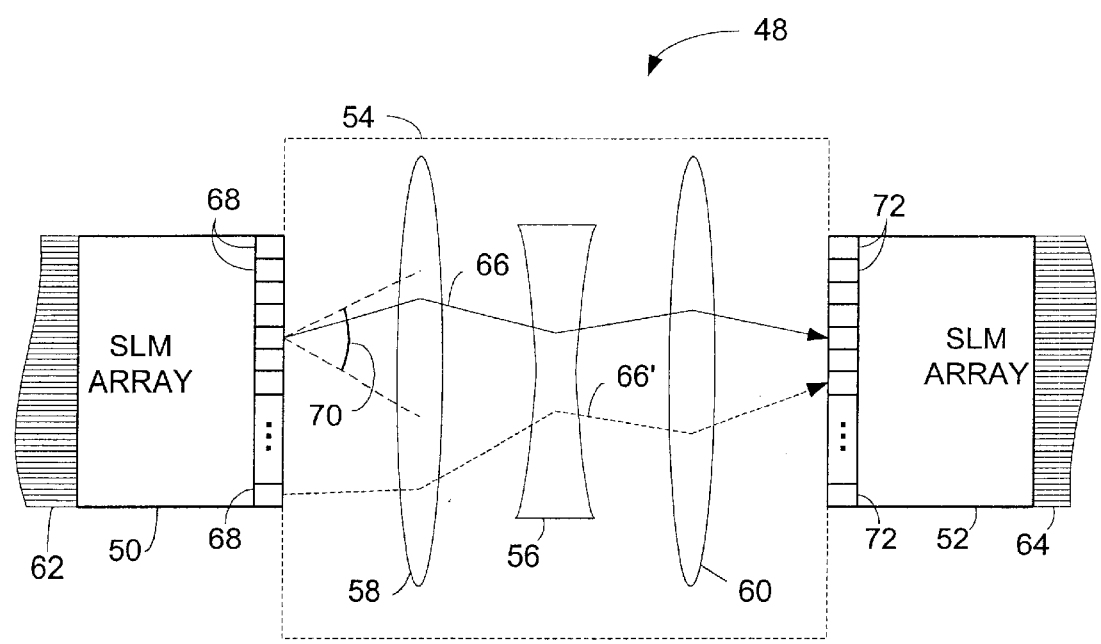
FIG. 3 illustrates an embodiment of an optical switch having input and output sections, each with a spatial light modulator (SLM) array.
Figure 4:
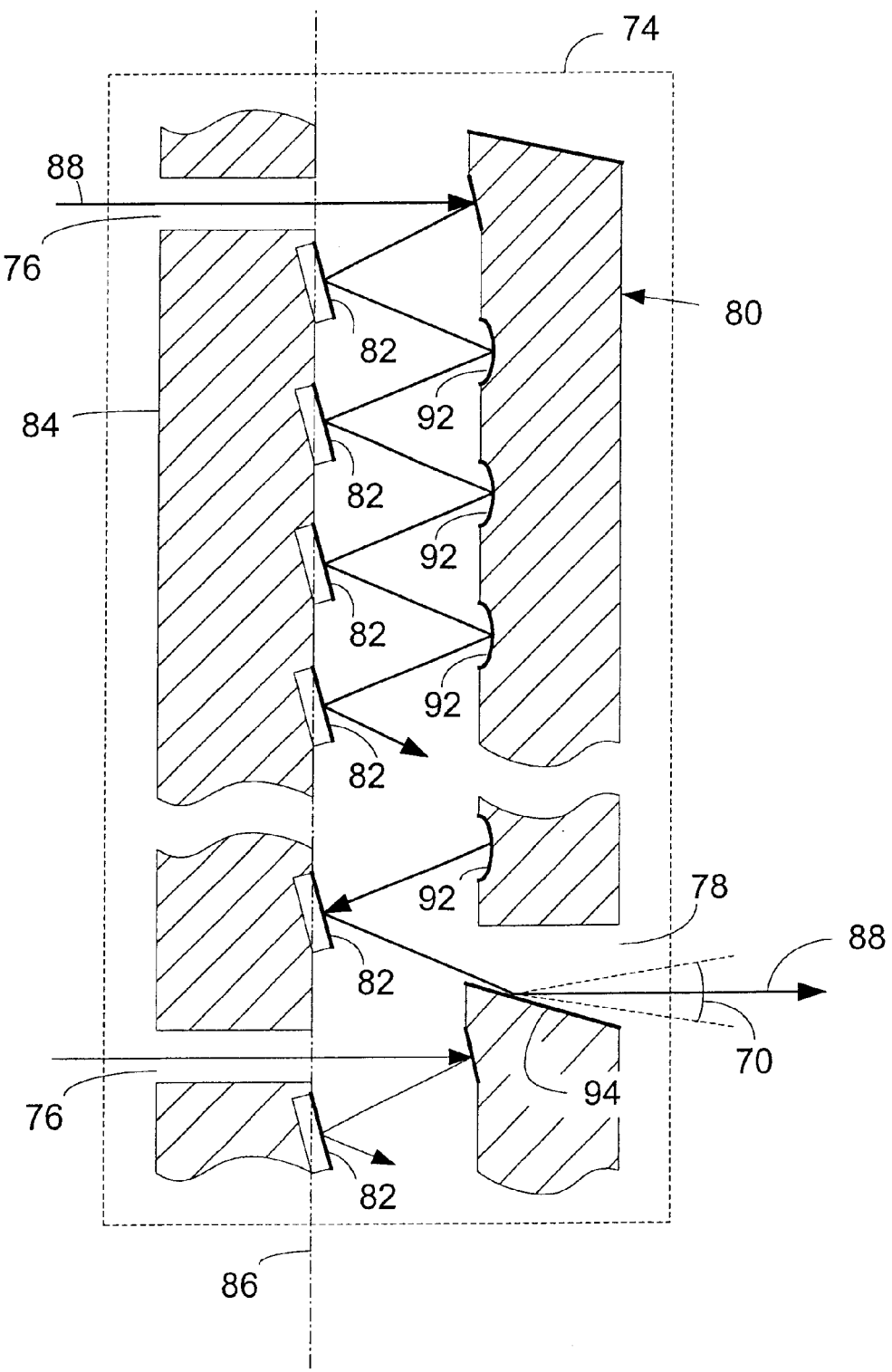
FIG. 4 illustrates the major elements of an embodiment of a single SLM.

Second channel switcher 12' is illustrated as currently inactive, i.e., it is not performing wavelength conversion. While second channel switch 12' is inactive, second optical switch 20' is being switched or reconfigured, as described in further detail below. First and second channel switchers 12 and 12', respectively, can be generally active in WDM signal conversion in alternating fashion. In other words, at a later time (not illustrated) second channel switcher 12' can be active in WDM signal conversion while first optical switch 20 is switched. Switching of first or second optical switch 20 or 20', as will be detailed below with reference to FIG. 3 and FIG. 4, is a process requiring more time than the process of configuring first and second optical selectors 14 and 28. Thus, the architecture of optical switching system 10, having parallel first and second channel switchers 12 and 12', provides wavelength conversion of a series of data packets or other trains of data more rapidly than possible using only one channel switcher.

First and second optical selectors 14 and 28, respectively, can be realized by any of a variety of well-known types of devices that can divert packets or other trains of data-carrying signals. For example, electro-absorbers or chromatic or polarizing beam splitters may be suitable. The devices can, in some embodiments of the invention, perform the selection or diversion function passively in response to, for example, alternating wavelengths or alternating polarizations of signals carrying successive packets. In other embodiments, they can be actively switched to perform the selection function.

As first and second channel switchers 12 and 12', are identical in structure and operation, a detailed description here of first channel switcher 12 will suffice. WDM input signal 16 enters first channel switcher 12 and first demultiplexer 18, which can be any suitable wavelength-division demultiplexer known in the art. First optical switch 20 can be any suitable nxn optical cross-connect switch. The number n is the number of channels of optical switching system 10. As should be apparent to persons of skill in the art to which the invention relates, first signals 30 produced by first demultiplexer 18 are separated and ordered by wavelength, each wavelength carrying data expressed by a time-varying amplitude. Each of the first signals 30 is directed by first optical switch 20 to produce one of the first switched signals 32 ($\lambda_1, \lambda_2, \lambda_3, \ldots \lambda_n$). This occurs in a controllably ordered fashion according to the cross-connect switching configuration of first optical switch 20.

Each of first switched signals 32 is received by a single channel of first wavelength converter 22. First wavelength converter 22, which is described in detail below with reference to FIG. 5, converts the wavelengths ($\lambda_1, \lambda_2, \lambda_3, \ldots \lambda_n$) of first switched signals 32 to the desired wavelengths ($\lambda_1', \lambda_2', \lambda_3', \ldots \lambda_n'$) to produce the first converted signals 34. This occurs in a fixed ordered fashion: First switched signal 32 having a wavelength $\lambda_1$ is converted to first converted signal 34 having a wavelength $\lambda_1'$; first switched signal 32 having a wavelength $\lambda_2$ is converted to first converted signal 34 having a wavelength $\lambda_2'$. First wavelength multiplexer 24 combines first converted signals 34 to produce converted WDM signal 26. Note that converted WDM signal 26 carries all of the data of WDM input signal 16.

Figure 2:
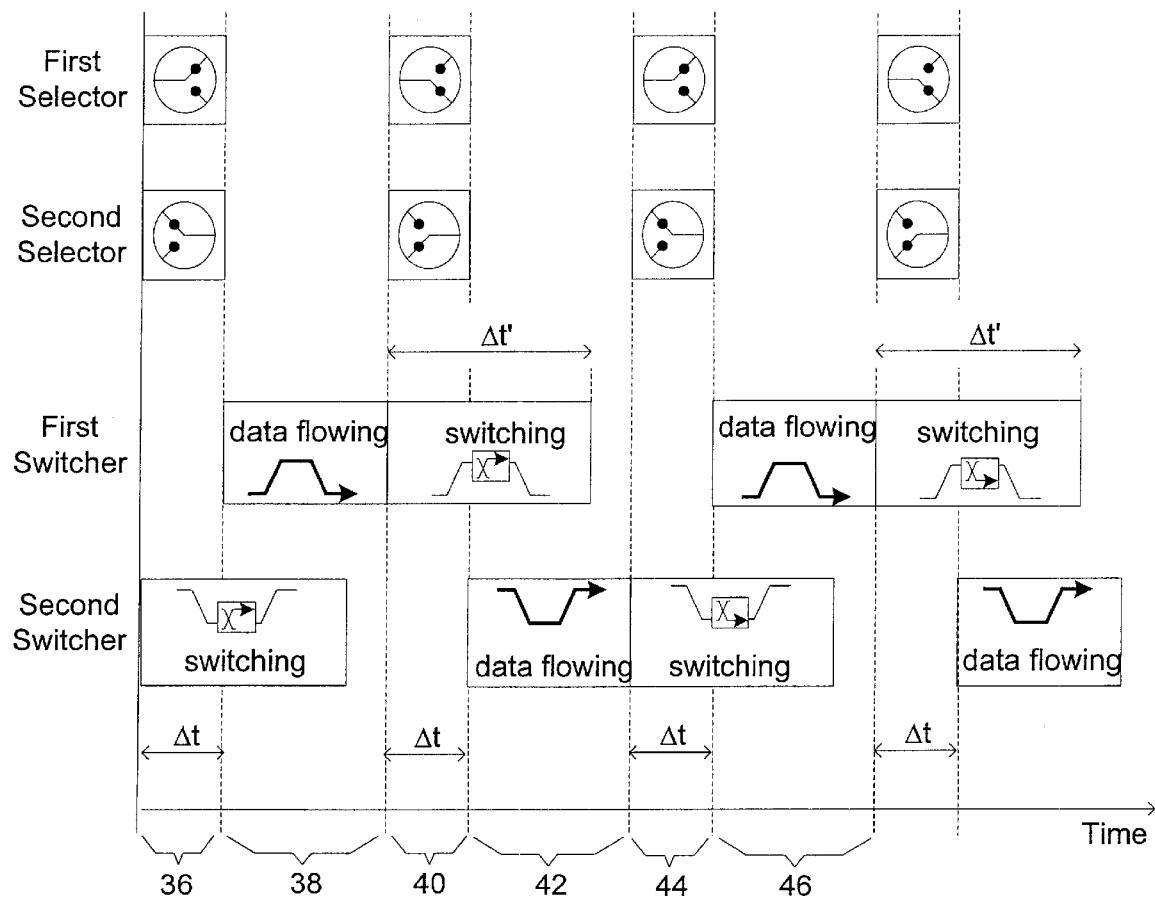
FIG. 2 is a timing diagram of an optical switching system.

A timing diagram illustrating the operation of optical switching system 10 (FIG. 1) is shown in FIG. 2. First and second optical selectors 14 and 28 (FIG. 1) are in alternating fashion configured to provide WDM signal coupling to first and second channel switchers 12 and 12' (FIG. 1), respectively. In the illustrated first time interval 36, first and second optical selectors 14 and 28, respectively, are configured to provide coupling to first channel switcher 12. In the second interval 38, first channel switcher 12 converts a WDM optical signal and data flow occurs through first channel switcher 12. When signal conversion in first channel switcher 12 is complete, first and second optical selectors 14 and 28, respectively, are configured, in the third time interval 40, to provide coupling to second channel switcher 12'. In the fourth time interval 42, second channel switcher 12' converts a WDM optical signal and data flow occurs through second channel switcher 12'. When that is complete, the conversion process will return to first channel switcher 12, and the process of conversion occurring through the alternating usage of first and second channel switchers 12 and 12', respectively, continues.

First and second channel switchers 12 and 12', respectively, must each be witched between usage periods. For example, first channel switcher 12 is switched after second time interval 38 in preparation for signal conversion in the sixth time interval 46. Each switcher is closed to conversion or inactive while it is being switched. The switching time $\Delta t'$ is illustrated and anticipated to be significantly greater than the time $\Delta t$ for selector configuration. Due to the architecture of optical switching system 10 (FIG. 1) and, as illustrated by the timing diagram of FIG. 2, the data flow is intermittently interrupted only by the relatively short time $\Delta t$ required for selector configuration. Thus, optical switching system 10 has a switching latency time no greater than this relatively short $\Delta t$. (Suitable selectors 14 and 28 having latency times on the orders of tens of nanoseconds are well-known, while the types of devices described below for switches 20 and 20' may have considerably longer latency-times.) It should be noted that the durations of signal conversions occurring in second, fourth, and sixth time intervals 38, 42, and 46, are not determined by the performance of optical switching system 10. Rather, these durations can be predetermined by optical network standardized protocols or can be variable with each packet of converted data.

FIGS. 3 and 4 illustrate first and second optical switches 20 and 20' (FIG. 1) in further detail. Such switches are also described in a copending U.S. patent application Ser. No. 09/948,143, filed Sep. 6, 2001, entitled "Optical Switch," incorporated in its entirety into this patent specification by this reference.

As described below, first and second optical switches 20 and 20' (FIG. 1) are based upon the concept of arrays of movable microelectromechanical mirrors. Nevertheless, in other embodiments of the invention any other suitable type of optical switch can be used. As illustrated in FIG. 3, each of first and second optical switches 20 and 20' (FIG. 1) can be an nxn optical switch 48. Switch 48 includes a first spatial light modulator (SLM) array 50 and a second SLM array 52 with an optical pathway 54 therebetween that includes a negative lens 56 and first and second positive lenses 58 and 60, respectively. First and second SLM arrays 50 and 52 each include the appropriate number n of SLMs, this number n being the number of channels of optical switching system 10 (FIG. 1).

Each SLM of first SLM array 50 of FIG. 3 can receive one of first signals 30 output by first demultiplexer 18 (FIG. 1). Each SLM of second SLM array 52 can provide one of first switched signals 32 to first wavelength converter 22 (FIG. 1). First and second optical fiber bundles 62 and 64, respectively, provide optical couplings to n×n optical switch 48 for incoming first signals 30 and outgoing first switched signals 32 (FIG. 1). In other embodiments, other types of optical pathways (not illustrated) can be included instead of one or both of first and second optical fiber bundles 62 and 64.

Each SLM of first SLM array 50 receiving an optical signal can output the optical signal into optical pathway 54 as a beam in a controllable direction. For example, a selected SLM can direct a first beam 66 through a corresponding one of first ports 68 at a selectable one of a number of discrete angles within an angular range 70. Indeed, in embodiments in which the array of first ports 68 is two-dimensional, angular range 70 is three-dimensional. (See above-referenced U.S. patent application Ser. No. 09/948,143.) Optical pathway 54 and its constituent negative lens 56 and first and second positive lenses 58 and 60 are arranged such that first beam 66 emanating from one of first ports 68 of first SLM array 50 is directed to impinge upon only one of the second ports 72 of second SLM array 52. Thus, selecting the angle at which first beam 66 emanates from one of first ports 68 of first SLM array 50 selects the one of second ports 72 of SLM array 52 upon which first beam 66 impinges. Thus, each beam angle at first ports 68 of first SLM array 50 uniquely corresponds to one of second ports 72 of second SLM array 52. Stated another way, each angle uniquely represents a destination communications switch channel. A second beam 66', illustrated emanating from another of first ports 68 of first SLM array 50 at an angle different from that of first beam 66, reaches a destination one of second ports 72 of second SLM array 52 different from that of first beam 66. Note that first and second beams 66 and 66' are shown only as examples, and the switch 48 can be operated with each SLM of first and second SLM arrays 50 and 52 actively directing and receiving, respectively, single-wavelength signals.

FIG. 4 illustrates an individual SLM 74 of the type included in first and second SLM arrays 50 and 52 (FIG. 3). Such an SLM is described in detail in the above-referenced patent application. Each SLM has an optical input 76 and an optical output 78. SLM 74 includes a microelectromechanical structure (MEMS) and a back reflector 80. SLM 74 can be constructed by forming a chain of two or more microelectromechanical mirrors 82 or other reflectors upon a substrate 84 or other supporting assembly. The chain of mirrors 82 extends along a longitudinal axis or SLM axis 86 that lies in the plane of substrate 84.

Although the techniques for making arrays of suitable electrically actuatable MEMS mirrors 82 are well-known in the art, in the illustrated embodiment of the invention mirrors 82 can have a structure of the type described in the specifications of the above-referenced copending U.S. patent application as well as co-pending U.S. patent application Ser. No. 09/862,958, filed May 22, 2001, which is incorporated in its entirety into this patent specification by this reference.

Suitable alternative constructions for mirrors 82 are described in the above-referenced patent application, some of which contemplate electrostatic actuation mechanisms and others of which contemplate piezoelectric, magnetic and similar electrically-controlled actuator technologies. Note that although other suitable electrically-actuatable MEMS mirrors are known in the art, the mirror structures described in the above-referenced patent specification provide a number of advantages over prior mirror structures, including the advantage that the discrete orientations of a reflective surface are extremely precisely located with respect to the overall structure to provide reliable and repeatable operation.

Referring again to FIG. 4, the angle at which an optical SLM beam 88 emanates from optical output 78 depends upon the combined switching states of mirrors 82. Each of mirrors 82 is optically coupled to an adjacent one of mirrors 82 through an optical pathway that, in the illustrated embodiment of the invention, includes a back reflector 80 having paraboloidal reflective surfaces 92 spaced by their focal lengths from opposing mirrors 82. Nevertheless, in other embodiments, the optical pathway coupling one of mirrors 82 to an adjacent one of mirrors 82 can include any other suitable type of optical element. SLM beam 88 enters SLM 74 and is reflected by back reflector 80 onto a first one of mirrors 82. That one of mirrors 82 reflects SLM beam 88 onto one of reflective surfaces 92 of back reflector 80, which, in turn, reflects SLM beam 88 onto an adjacent one of mirrors 82. In this manner, SLM beam 88 propagates to successive mirrors 82 down the chain along SLM axis 86. The last mirror in the chain reflects SLM beam 88 onto another reflective surface 94 that directs SLM beam 88 toward optical output 78 at a selectable one of a number of discrete angles within an angular range 70. Note that the designations "optical input" 76 and "optical output" 78 refer to the illustrated function in FIG. 4 rather than the structure of SLM 74 itself.

Figure 5:
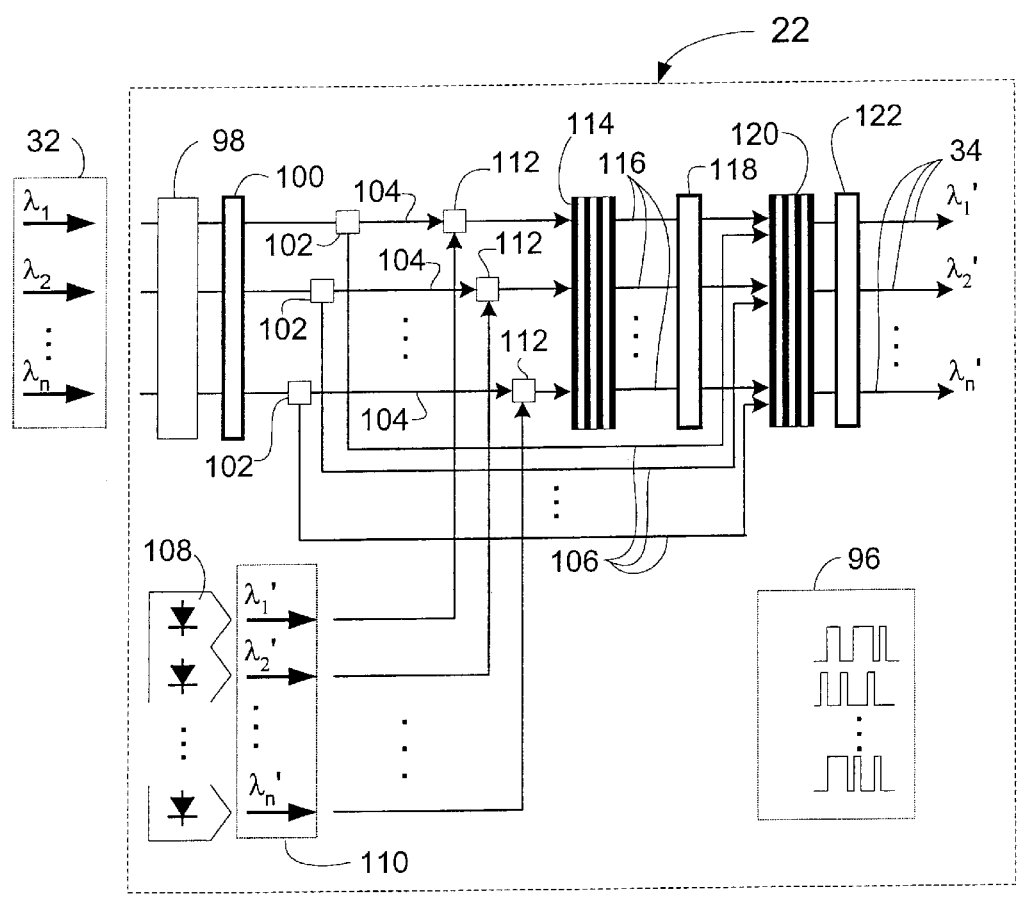
FIG. 5 is a block diagram of a multi-channel wavelength converter.

First wavelength converter 22 (FIG. 1) is illustrated in further detail in FIG. 5. Such converters are also described in copending U.S. patent application Ser. No. 10/003,146, filed Nov. 15, 2001, entitled "Optical Converter with a Designated Output Wavelength," which is incorporated in its entirety into this patent specification by this reference. As illustrated in FIG. 5, first wavelength converter 22 receives as input first switched signals 32 each at a particular wavelength ($\lambda_1, \lambda_2, \ldots \lambda_n$) and data pattern. Each element of the data pattern set 96 corresponds to a particular wavelength signal of first switched signals 32. A multi-channel optical amplifier 98 boosts the amplitude of each of switched signals 32. A depolarizer 100 equalizes any polarization components of the amplified signals. Each of polarizing splitters 102 receives one of the amplified signals and outputs one each of first and second split signals 104 and 106, respectively. A multi-channel continuous-wave optical pump beam source 108 provides a plurality of pump beams 110, each at a particular pump beam wavelength ($\lambda_1', \lambda_2', \ldots \lambda_n'$). The embodiment illustrated in the FIG. 5 provides that each of first split signals 104 is combined with one of pump beams 110 by one of the combiners 112. Such an arrangement can be appropriate for intraband wavelength conversion or other purposes. Alternately, each of first split signals 104 and pump beams 110 can be coupled separately into a sum frequency generation (SFG) crystal 114 as can be appropriate for interband conversion.

As illustrated in FIG. 5, each of combiners 112 emits a combined signal, which enters SFG crystal 114. Interim signals 116 are each generated from the interaction of a single one of first split signals 104 and a corresponding one of pump beams 110 within SFG crystal 114 by the SFG process. Accordingly, the frequency of each of the interim signals 116 is the sum of the frequencies of the single one of first split signals 104 and the corresponding one of pump beams 110. The high-pass filter 118 removes any residual pump beam and first split signal components from the outputs of SFG crystal 114 and transmits interim signals 116.

Interim signals 116 enter a difference frequency generation (DFG) crystal 120, each with a corresponding one of second split signals 106. The propagation delays in the paths of the second split signals 106 and interim signals 116 are matched to provide the synchronization of their anivals at DFG crystal 120. Converted signals 34 are each generated by the DFG process within DFG crystal 120 from one of interim signals 116 and the corresponding one of second split signals 106. Accordingly, the frequency of each of converted signals 34 is the difference of the frequencies of the one of interim signals 116 and the corresponding one of second split signals 106. The bandpass filter 122 removes any residual components of interim signals 116 and second split signals 106 from the outputs of DFG crystal 120, and transmits only converted signals 34. Converted signals 34 comprise a plurality of signals as illustrated, each with a particular wavelength and data pattern. The wavelengths ($\lambda_1'$, $\lambda_2'$, ... $\lambda_n'$) of converted signals 34 are of pump beams 110. Thus, converted signals 34 carry the data of data pattern set 96 at the wavelengths of pump beams 110. Converted signals 34 are output from wavelength converter 22 to wavelength multiplexer 24 of FIG. 1.

Although in the illustrated embodiment of the invention wavelength conversion in optical switching system 10 is provided by wavelength converter 22 as described above, in other embodiments it can be provided by a number of single-channel wavelength converters (not shown) each comprising a single SFG crystal, a single DFG crystal, and an included or associated pump beam source. An optical switching system with a high number of channels can comprise a number of multi-channel wavelength converters of the type described above.

It will be apparent to those skilled in the art that various modifications and variations can be made in the present invention without departing from the scope or spirit of the invention. Other embodiments of the invention will be apparent to those skilled in the art as a result of consideration of the specification and practice of the invention disclosed herein. It is intended that the specification and examples be considered as exemplary only, with the true scope and spirit of the invention being indicated by the following claims.

What is claimed is:

1. An optical switching system comprising:
   a first optical selector comprising an input, a first output and a second output;
   a first channel switcher, comprising:
   a first optical switch having a first-switch input and a plurality of first-switch outputs, the first-switch input optically coupled to the first output of the first optical selector;
   a first multi-channel optical wavelength converter having a plurality of channels, each channel having a first-converter input and a first-converter output, each first-converter input optically coupled to a corresponding first-switch output; and
   a first optical wavelength multiplexer having a first-multiplexer output and a plurality of first-multiplexer inputs, each first-multiplexer input optically coupled to a corresponding first-converter output; a second channel switcher, comprising:
   a second optical switch having a second-switch input and a plurality of second-switch outputs, the second-switch input optically coupled to the second output of the first optical selector;
   a second multi-channel optical wavelength converter having a plurality of channels, each channel having a second-converter input and a second-converter output, each second-converter input optically coupled to a corresponding second-switch output; and
   a second optical wavelength multiplexer having a second-multiplexer output and a plurality of second-multiplexer inputs, each second-multiplexer input optically coupled to a corresponding second-converter output; and
   a second optical selector comprising a first input, a second input and an output output, the first input of the second optical selector optically coupled to the first-multiplexer output, and the second input of the second optical selector optically coupled to the second-multiplexer output.

2. The optical switching system of claim 1, wherein each of the first and second optical switches comprises a plurality of electrically controllable microelectromechanical movable reflectors.

3. The optical switching system of claim 2, wherein the second optical selector is a passive coupler.

4. The optical switching system of claim 2, wherein the first optical selector is a passive separator.

5. The optical switching system of claim 4, wherein the first optical selector is a wavelength-based separator.

6. The optical switching system of claim 4, wherein the first optical selector is a polarization-based separator.

7. The optical switching system of claim 3 wherein the first optical selector is a controllable electro-optic switch.

8. The optical switching system of claim 2, wherein:
   the first channel switcher further comprises a first demultiplexer having a first-demultiplexer input and a plurality of first-demultiplexer outputs, and the first optical switch is a cross-connect switch having a plurality of the first-switch inputs, the first-demultiplexer input is optically coupled to the first output of the first optical selector, and each first-switch input is optically coupled to a corresponding one of the first-demultiplexer outputs; and
   the second channel switcher further comprises a second demultiplexer having a second-demultiplexer input and a plurality of second-demultiplexer outputs, and the second optical switch is a cross-connect switch having a plurality of the second-switch inputs, the second-demultiplexer input is optically coupled to the second output of the first optical selector, and each second-switch input is optically coupled to a corresponding one of the first-demultiplexer outputs.

9. The optical switching system of claim 8, wherein the first optical selector is a passive separator.

10. The optical switching system of claim 9, wherein the first optical selector is a wavelength-based separator.

11. The optical switching system of claim 9, wherein the first optical selector is a polarization-based separator.

12. The optical switching system of claim 8, wherein the first optical selector is a controllable electro-optic switch.

13. The optical switching system of claim 8, wherein each of the first and second optical switches of the first and second channel switchers comprises:
   a first section comprising a plurality of spatial light modulators for directing optical signals, each spatial light modulator (SLM) having an SLM optical input, an SLM optical output and a reflector assembly, the reflector assembly comprising a plurality of electrically controllable microelectromechanical movable reflectors arranged along an SLM axis, each movable reflector having a reflective surface electrically orientable in a selectable one of a plurality of discrete switching orientations, a first movable reflector of the plurality of movable reflectors optically coupled to the optical input to receive an optical signal from the optical input, each successive movable reflector of the plurality of movable reflectors optically coupled to a preceding movable reflector of the plurality of movable reflectors to receive the optical signal reflected by the preceding movable reflector, a last movable reflector of the plurality of movable reflectors optically coupled to a preceding movable reflector to receive the optical signal reflected by the preceding movable reflector, the SLM optical output optically coupled to the last movable reflector to receive the signal reflected by the last movable reflector;

a second section comprising a plurality of SLMs, each SLM having an SLM optical input, an SLM optical output and a reflector assembly, the reflector assembly comprising a plurality of electrically controllable microelectromechanical movable reflectors arranged along an SLM axis, each movable reflector having a reflective surface electrically orientable in a selectable one of a plurality of discrete switching orientations, a first movable reflector of the plurality of movable reflectors optically coupled to the optical input to receive an optical signal from the optical input, each successive movable reflector of the plurality of movable reflectors optically coupled to a preceding movable reflector of the plurality of movable reflectors to receive the optical signal reflected by the preceding movable reflector, a last movable reflector of the plurality of movable reflectors optically coupled to a preceding movable reflector to receive the optical signal reflected by the preceding movable reflector, the optical output optically coupled to the last movable reflector to receive the signal reflected by the last movable reflector; and an optical pathway interposed between the SLM optical outputs of the first section and the optical inputs of the second section.

14. The optical switching system of claim 13, wherein each of the first and second multi-channel optical wavelength converters comprises:

a plurality of optical sum frequency generators integrally formed with each other in a crystal;

a plurality of optical difference frequency generators integrally formed with each other in a crystal;

a plurality of continuous-wave optical beam sources;

a plurality of splitters, each having an input coupled to one of a plurality of converter inputs and having a first splitter output and a second splitter output;

a plurality of first combiners, each having a first input coupled to a corresponding one of the first splitter outputs, a second input coupled to an output of a corresponding one of the continuous-wave optical beam sources, and an output coupled to an input of a corresponding one of the optical sum frequency generators;

a plurality of second combiners, each having a first input coupled to an output of a corresponding one of the optical sum frequency generators, a second input coupled to a corresponding one of the second splitter outputs, and an output coupled to an input of a corresponding one of the optical difference generators; and a multiplexer having a plurality of inputs, each coupled to an output of a corresponding one of the difference frequency generators, and having a converter output.

15. A method for sequentially routing optical data packets between two or more channel switchers operating in parallel to minimize switch latency, comprising:

a) coupling an optical data packet source to an input of a first channel switcher comprising a first optical switch, a first multi-channel optical wavelength converter and a first optical wavelength multiplexer, the first optical switch having a first-switch input and a plurality of first-switch outputs, the first-switch input optically coupled to the first output of the first optical selector, the first multi-channel optical wavelength converter having a plurality of channels, each channel having a first-converter input and a first-converter output, each first-converter input optically coupled to a corresponding first-switch output, the first optical wavelength multiplexer having a first-multiplexer output and a plurality of first-multiplexer inputs, each first-multiplexer input optically coupled to a corresponding first-converter output;

b) the input of the first channel switcher receiving an optical data packet from the optical data packet source;

c) switching a second channel switcher contemporaneously with reception of the optical data packet by the first channel switcher, the second channel switcher comprising a second optical switch, a second multi-channel optical wavelength converter and a second optical wavelength multiplexer, the second optical switch having a second-switch input and a plurality of second-switch outputs, the second-switch input optically coupled to the second output of the first optical selector, the second multi-channel optical wavelength converter having a plurality of channels, each channel having a second-converter input and a second-converter output, each second-converter input optically coupled to a corresponding second-switch output, the second optical wavelength multiplexer having a second-multiplexer output and a plurality of second-multiplexer inputs, each second-multiplexer input optically coupled to a corresponding second-converter output;

d) coupling the optical data packet source to an input of the second channel switcher;

e) the input of the second channel switcher receiving an optical data packet from the optical data packet source; and f) switching the first channel switcher contemporaneously with reception of the optical data packet by the second channel switcher.

16. The method of claim 15, further comprising the step of repeating steps a through f in sequence until all data packets have been alternatingly received by the first and second channel switchers.

17. The method of claim 16, wherein:

the step of switching the first channel switcher comprises switching the first optical switch to connect one of a plurality of first-switch inputs of the first optical switch to a selected one of a plurality of first-switch outputs of the optical switch; and the step of switching the second channel switcher comprises switching the second optical switch to connect one of a plurality of second-switch inputs of the second optical switch to a selected one of a plurality of second-switch outputs of the second optical switch.

18. The method of claim 17, wherein:

the step of switching the first optical switch comprises changing orientations of a plurality of electrically controllable microelectromechanical movable reflectors; and the step of switching the second optical switch comprises changing orientations of a plurality of electrically controllable microelectromechanical movable reflectors.

19. The method of claim 18, wherein:

the step of coupling an optical data packet source to an input of a first channel switcher comprises passively separating the optical data packet; and the step of coupling an optical data packet source to an input of a first channel switcher comprises passively separating the optical data packet.

20. The method of claim 19, wherein the step of passively separating the optical data packet comprises separating the optical data packet based upon wavelength of the data packet.

21. The method of claim 19, wherein the step of passively separating the optical data packet comprises separating the optical data packet based upon polarization of the data packet.

22. The method of claim 18, wherein:

the step of coupling an optical data packet source to an input of a first channel switcher comprises switching an electro-optic switch; and the step of coupling an optical data packet source to an input of a first channel switcher comprises switching the electro-optic switch.

* * * * *